(12) United States Patent
Rivera et al.

(10) Patent No.: US 6,432,020 B1
(45) Date of Patent: Aug. 13, 2002

(54) DIFFERENTIAL LOCKING ASSEMBLY

(76) Inventors: Lazaro Rivera, 2501 S. Ocean Dr. #1407, Hollywood, FL (US) 33019; Ruben Arrieta, 837 SW. 118 Ter., Davie, FL (US) 33325

( * ) Notice: Subject to any disclaimer, the term of this patent is extended or adjusted under 35 U.S.C. 154(b) by 0 days.

(21) Appl. No.: 09/635,944

(22) Filed: Aug. 10, 2000

(51) Int. Cl.$^7$ .............................................. F16H 48/24
(52) U.S. Cl. ..................................................... 475/231
(58) Field of Search ................................ 475/237, 231, 475/238, 239, 240, 241; 180/250

(56) References Cited

U.S. PATENT DOCUMENTS

| | | | |
|---|---|---|---|
| 3,994,184 A | 11/1976 | Osborn | |
| 4,043,224 A | 8/1977 | Quick | |
| 4,555,962 A | 12/1985 | Bucarelli | |
| 4,621,540 A | 11/1986 | Davison | |
| 4,703,671 A | 11/1987 | Jikihara | |
| 4,811,629 A | 3/1989 | Monquin et al. | |
| 5,171,192 A | * 12/1992 | Schlosser et al. | ........... 475/237 |
| 5,342,255 A | 8/1994 | Slesinski et al. | |
| 5,591,098 A | * 1/1997 | Jones et al. | ................. 475/231 |
| 5,673,777 A | * 10/1997 | Ziech | ..................... 475/237 X |
| 5,836,220 A | 11/1998 | Valente | |
| 5,947,859 A | * 9/1999 | McNamara | ................. 475/237 |
| 6,007,449 A | 12/1999 | Okada et al. | |
| 6,083,134 A | * 7/2000 | Godlew | ....................... 475/231 |

* cited by examiner

*Primary Examiner*—Charles A. Marmor
*Assistant Examiner*—Ankur Parekh
(74) *Attorney, Agent, or Firm*—Malloy & Malloy, P.A.

(57) ABSTRACT

A locking assembly for a differential of a motor vehicle, wherein corresponding drive axle shafts of the motor vehicle may be selectively positioned between a locked and an unlocked position by activation of a positioning assembly which is preferably, but not exclusively, a manual shifter mechanism. In the locked position, the differential locking assembly serves to interlock the corresponding axle shafts, such that the drive wheels associated therewith rotate in a synchronous manner, rather than relative to one another at different speeds. A locking gear assembly comprises a first locking gear, formed on one side gear of the differential and a second locking gear, formed on a locking member, wherein manipulation of the positioning assembly selectively positions the first and second locking gears into and out of intermeshing engagement with one another. A durable, high strength mounting assembly movably supports the locking member on a housing of the differential, such that the locking member rotates therewith and moves relative thereto when selectively disposed between the locked position and the unlocked position.

20 Claims, 6 Drawing Sheets

DIFFERENTIAL LOCKING ASSEMBLY

BACKGROUND OF THE INVENTION

1. Field of the Invention

This invention is directed to a differential locking assembly, which may be manually actuated and which is specifically, but not exclusively, adaptable for use on a four wheel drive, off-road vehicle.

2. Description of the Related Art

A differential assembly, of the type found on motor vehicles, comprises a gear system which is generally structured to transfer power from a drive or propeller shaft to the output or drive axle shafts of the vehicle. The differential assembly typically incorporates a ring gear which is secured to a housing or carrier of the differential and rotatable therewith. Also the ring gear is disposed in intermeshing, driven engagement with the propeller or drive shaft. Torque or rotational force is transferred to the axle shafts and their and associated drive wheels. More particularly, the rotational or driving force is transferred from the drive shaft to the differential housing and eventually to the drive axles, which are splined to respectively disposed and rotationally interconnected side gears. The side gears are mounted within the differential housing and are rotationally interconnected by means of a spider gear assembly. The spider gear assembly typically comprises two spaced apart pinion gears, which are interconnected by a cross pin or like structure and which serve to rotationally interconnect each of the two side gears.

In operation, as the drive or propeller shaft rotates, it serves to rotate the ring gear which in turn rotates the differential housing to which the ring gear is securely attached. The two pinion gears, which define the spider gear assembly, rotationally interact with the two side gears, so as to rotate the output axle shafts and the drive wheels mounted on the outer ends thereof. When the motor vehicle is moving in a straight line direction, the ring gear and differential housing rotate together. In this straight line movement, the pinion gears of the spider gear assembly apply equal force to each of the side gears and their attached output axle shafts, as well as the respective wheels secured thereto. However, when the vehicle travels in a turning direction, the resistance against the rotation of one of the output axle shafts increases as the inner and outer wheels turn at different speeds. This difference in speed encourages the differential pinion gears of the spider gear assembly to rotate and turn the side gear on the axle encountering the increased resistance.

As generally described above, the structure and operation of a somewhat conventional differential serves an important purpose in the operation of a motor vehicle, especially when operating in a conventional, "on-road" environment. As set forth above, the use of the differential serves to transmit the driving torque from the drive shaft through the differential and apply such torque to either wheel substantially equally even though one wheel is rotating at a faster rate than the other, when the vehicle is involved in a turning maneuver. However, it is well recognized that in a number of situations it is highly desirable to lock the drive wheels of a vehicle so that they rotate synchronously. By locking the drive wheels of the vehicle to rotate at a synchronous speed, variations in traction of the drive wheels of the vehicle will not affect the rate of relative rotation between the drive wheels which are associated with the same axle. Therefore, the drive wheels associated with a common axle will rotate in unison even though there is variable traction, which normally causes slippage of one or other of the drive wheels.

It is well known that off-road vehicles, when encountering rough terrain, frequently have one or other of the drive wheels inadvertently disposed above or otherwise out of contact with the ground or surface over which the vehicle is traveling. The absence of a differential locking assembly in such situations would result in the free or non-contact wheel rotating while the opposite wheel, disposed in engaging relation with the surface, is absent rotational torque. Accordingly, there is a well recognized need and important use of differential locking assemblies capable of selectively locking the axle shafts of corresponding drive wheels, such that the wheels rotate synchronously regardless of their relative orientation or the amount of resistance being encountered.

Numerous attempts have been made to establish an efficient, durable, high strength locking assembly which may be applied to a variety of vehicles. Such differential locking assemblies are available for both manual and "automatic" activation. In the latter category of automatic activation assemblies, sensing devices are incorporated within the differential so as to automatically activate an associated locking structure and thereby dispose the associated axle shafts into a synchronous, locked mode. While assumed to be functional for their intended purpose, such "automatic" activation assemblies are not particularly applicable or desirable for use in the four wheel drive, "off-road" vehicles, which are specifically designed and structured to travel over extremely rough terrain. In such an environment, the manual actuation of a differential lock is preferable and generally considered to be both more reliable and durable.

Accordingly, there is a significant need in the field of differential locking assemblies for a high strength, durable and consistently operative locking assembly which is particularly, but not exclusively, adaptable for use in off-road, four wheel drive vehicles. The design and structure of such an improved and preferred differential locking assembly should be such as to be readily adaptable for an "after market" application, such that off-road vehicles, of the type described above, can be easily adapted to include an improved differential locking assembly having all of the attributes which are necessary to endure the rigors of off-road operation.

SUMMARY OF THE INVENTION

The present invention is directed towards a locking assembly for the differential of a motor vehicle and is particularly, but not exclusively, adaptable for use on "off-road", vehicles of the type which are structured or modified to travel over extremely rough terrain. As a result of the vehicle operating in such a harsh environment, it is not uncommon for one of the drive wheels of an associated axle to be lifted or positioned out of contact with the ground or other surface over which the vehicle is traveling. In such instances, the operation of a conventional differential will deliver rotational torque or driving force to the wheel which is not in contact with the surface. For obvious reasons, such a situation is highly undesirable and will significantly affect the efficient and desired operation of the vehicle.

Accordingly, the present invention is directed towards a locking assembly which is preferably, but not exclusively, manually actuated so as to selectively dispose the locking assembly into a either a locked position or an unlocked position, at the will of the operator. When in the locked position, both drive wheels associated with a common axle will be locked so as to rotate in synchronous relation to one another, thereby overcoming the conventional operation of the differential.

More specifically, the differential locking assembly of the present invention is structured to function with cooperative components of a differential, such as, but not limited to the type produced and made commercially available by the Dana Corporation of Toledo, Ohio. As such, a differential housing or carrier has a ring-gear fixedly secured thereto so as to rotate therewith. Also in substantially conventional fashion, the ring gear is rotationally driven by its interconnection with the drive shaft of the vehicle. Such interconnection also serves to rotate the differential housing. Two side gears are mounted within the differential housing and normally rotate relative thereto. The side gears are secured in driving relation to co-extensive axle shafts of an axle assembly, wherein the outer end of each axle shaft is secured to a separate drive wheel. The inner end of each axle shaft is secured, by a splined engagement, with respective ones of the aforementioned side gears. A spider gear assembly, comprising spaced apart pinion gears and an interconnecting cross pin, serves to rotationally interconnect the side gears and is cooperatively structured therewith to define the operational workings of the differential.

Structural features of the differential locking assembly of the present invention include a locking member mounted on the differential housing so as to rotate therewith and move relative thereto, into and out of the aforementioned locked end unlocked positions. In addition, the locking assembly of the present invention includes a locking gear assembly which is disposed and structured to establish a locking interconnection of both of the axle shafts of an associated drive axle. As a result, both drive wheels of the associated drive axle are locked into synchronous rotation with one another regardless of their respective orientations relative to the ground or other surface over which the vehicle is traveling.

The aforementioned locking gear assembly is structured to be durable, strong, reliable and perform consistently, particularly in the harsh environment in which off-road vehicles are intended to operate. In order to provide such reliable and durable performance, the locking gear assembly includes a first locking gear integrally formed on an outer face of one of the side gears. The locking gear assembly also includes a second locking gear integrally formed on a corresponding or confronting surface or face of the locking member. As set forth above, the locking member is selectively positionable or slidable on the differential housing as it rotates therewith. Therefore, the first and second locking gears may be selectively disposed into intermeshing engagement with one another, as the differential housing rotates, to define the aforementioned locked position or selectively disposed out of engagement with one another to define the aforementioned unlocked position. Additional structural features, as set forth in greater detail hereinafter, are attributable to the first and second locking gears in order to assure their durability and consistently reliable performance under the aforementioned harsh operating conditions.

Other structural features incorporated within the differential locking assembly of the present invention include to a mounting assembly which movably supports the locking member on the differential housing so that it selectively moves relative thereto, between the aforementioned locked position and unlocked position. The mounting assembly comprises a plurality of transversely elongated cams of predetermined number, collectively arranged in a predetermined configuration so as to engage an equal number of correspondingly dimensioned and configured apertures formed in the locking member. Movable support of the locking member on the differential housing is thereby accomplished and failure and breakage due to stress placed on the locking member, such as when it is selectively disposed in the locked position, is significantly reduced or eliminated. The noticeable reduction in stress failures of the subject locking assembly is due, at least in part, to the equal distribution of forces which the mounting assembly may accommodate due its structure, disposition and cooperative engagement with both the differential housing and the locking member.

Another structural feature of the present invention is the inclusion of a positioning assembly which may be selectively activated to assume either the locked position or the unlocked position. It is well known in the structural design and operation of other locking assemblies to provide for either the manually or "automatic" activation thereof. Under certain pre-established operating conditions, conventional differential lockers will be automatically activated to lock the drive wheels of a vehicle into synchronous rotation with one another. Typically, such automatic activation assemblies include hydraulic, pneumatic and/or electric modes of operation. While such automatic activation assemblies are generally considered to be operative for their intended function, they frequently are not designed to effectively operate with off-road, four wheel drive vehicles. Therefore, the differential locking assembly of the present invention is specifically, but not exclusively, adaptable for manual activation. Therefore, the positioning assembly of the present invention preferably comprises a manual shifter mechanism, connected by a drive cable, of the type well known and used extensively in modern day motor vehicles, to a fork-type shifter. The fork shifter selectively engages the locking member and moves it in a direction which is coaxial to the axis of rotation of the differential housing and the corresponding side gear. Operative interconnection of the manual shifter, located within the passenger compartment of the vehicle, and the locking member by the aforementioned drive cable, serves as a reliable and efficient structure for selectively positioning the locking member. The locking member need only be moved a relatively small distance relative to the one side gear on which the first locking gear is formed, in order to position the locking member into the aforementioned locked position. In addition, a plurality of biasing springs are disposed between the differential housing and the locking member so as to normally bias the locking member and the first and second locking gears, as set forth above, out of engagement with one another or into the unlocked position. Certain mechanical linkages associated with the manual shifter readily overcome this biasing force allowing the locking member to be easily disposed into the locked position, as described.

Therefore, the differential locking assembly of the present invention is preferably, but not exclusively, manually actuated for disposition in either a locked position or an unlocked position and includes specific structural components that assure durability, reliability and consistent operational characteristics, especially when the vehicle is operating under the extremely harsh environment of off-road conditions.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As shown in the accompanying drawings, the present invention is directed towards a differential locking assembly, generally indicated as 10, and structured for use on a motor vehicle. The locking assembly 10 is particularly, but not exclusively, adapted for use on a four wheel drive, off-road vehicle due at least partially to its durability, reliability and consistent operating characteristics especially when performing in the harsh environment typically encountered by off-road vehicles.

Figure 2:
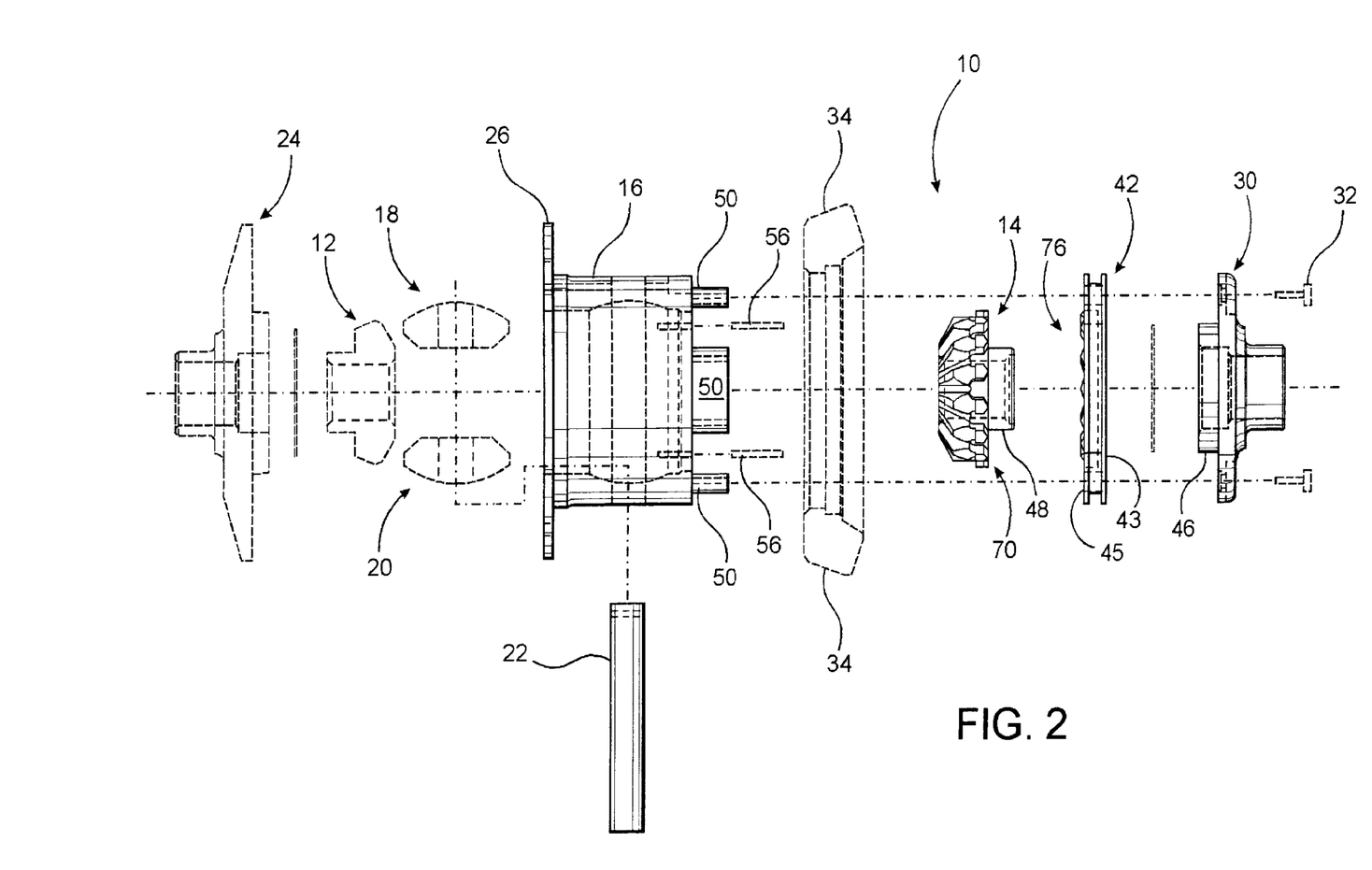
FIG. 2 is a exploded view in partial phantom of the various components comprising the differential and associated locking assembly of the present invention.

More specifically, and as best shown in FIG. 2, a differential with which the locking assembly 10 is utilized includes two side gears 12 and 14. The side gears 12 and 14 are mounted within a differential carrier or housing 16 which is to be considered a part of the locking assembly of the present invention. The side gears 12 and 14 are rotationally interconnected by a somewhat conventional spider gear assembly. The spider gear assembly is more specifically defined by two spaced apart pinion gears 18 and 20 interconnected by an elongated cross pin 22, wherein all of such components are movably mounted within the differential housing 16. An end cap or cover member 24 is secured in overlying at least partially covering relation to one end of the differential housing 16 and is attached to the outwardly extending peripheral flange 26 by means of a plurality of bolts or like connectors (not shown for purposes of clarity) passing through the mounting apertures 28. Similarly, an oppositely disposed end cap or cover member 30 is attached by connectors 32 in overlying covering relation to an opposite end of the differential housing 16, as will be explained in greater detail hereinafter.

Figure 1:
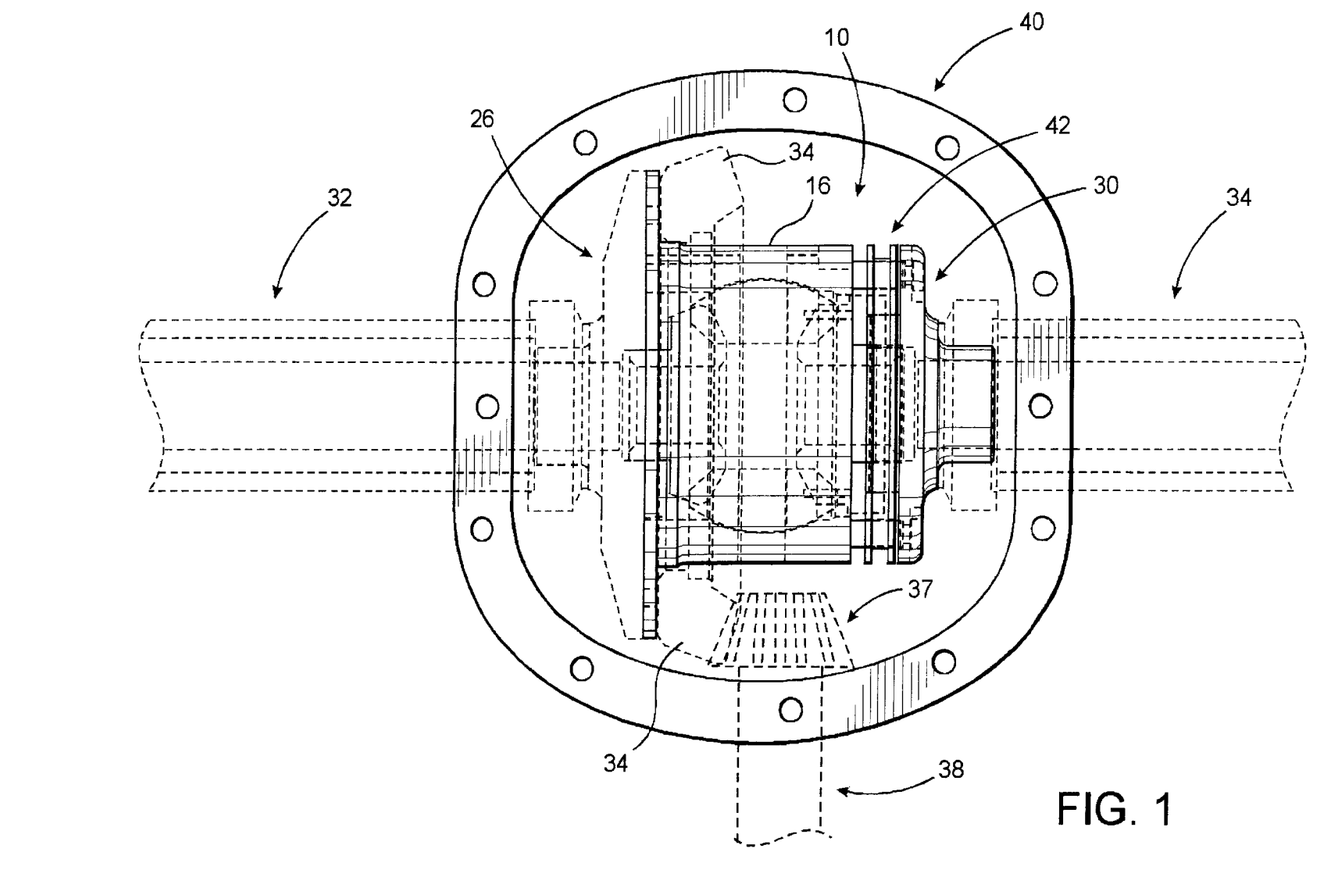
FIG. 1 is a front view in partial phantom of an assembled differential of a motor vehicle including the locking assembly of the present invention.

The respective cover members 24 and 30, as well as the two side gears 12 and 14 include centrally disposed openings sufficiently dimensioned and configured to allow the passage of at least a portion of respective axle shafts 32 and 34 there through. The axle shafts are operatively connected to the differential, as well as the locking assembly 10 associated therewith, as best shown in FIG. 1. Naturally, the opposite or outer ends of each of the axle shafts 32 and 34 have corresponding drive wheels (not shown) mounted thereon. The inner ends of each of the axle shafts 32 and 34, as represented in phantom lines in FIG. 1, are attached in driving interconnection with the respective side gears 12 and 14, through a splined engagement 36, of the type shown in FIG. 3.

In addition to the above, the differential includes a somewhat, conventional ring gear 34 with which the differential locking assembly of the present invention is operatively associated. The ring gear 34 is fixedly mounted on the differential housing 16 so as to be exteriorly accessible for interconnection to a drive pinion 37 associated with the drive shaft 38. Accordingly, as also shown in FIG. 1, the various components of the differential locking assembly 10, as well as certain operative components of the differential with which the locking assembly 10 is operatively associated, are housed within a casing 40. The casing 40 may be of conventional design or may be structurally modified to incorporate the various components of the differential locking assembly 10, including a drive cable 84, to be described in greater detail hereinafter.

Due to the fixed mounting or attachment of the ring gear 34 to the differential housing 16, driving rotation of the ring gear 34 will cause rotation of the differential housing 16. Rotation of the differential housing 16 will thereby cause relative rotation of the spider assembly, defined by the pinion gears 18 and 20, within the interior of the differential housing 16. The two side gears 12 and 14 which are drivingly attached to the axle shafts 32 and 34 respectively, are thereby forced into rotation upon the rotation of the differential housing 16.

Figure 4A:
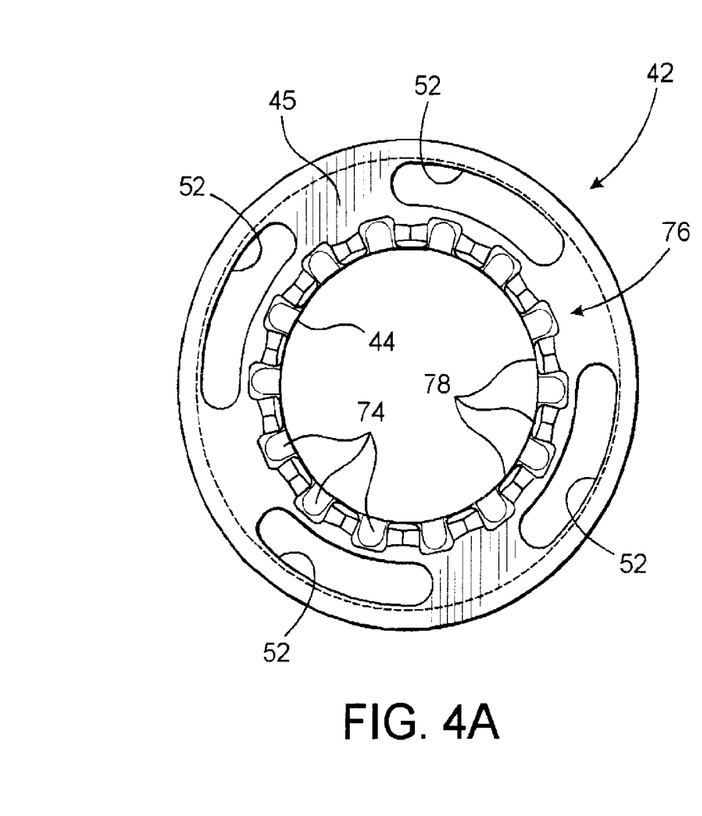
FIG. 4A is a front view of a locking member associated with the locking assembly of the present invention.
Figure 4B:
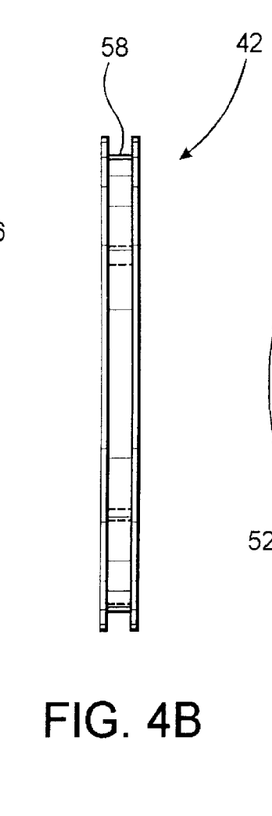
FIG. 4B is a side view of the embodiment of FIG. 4A.
Figure 4C:
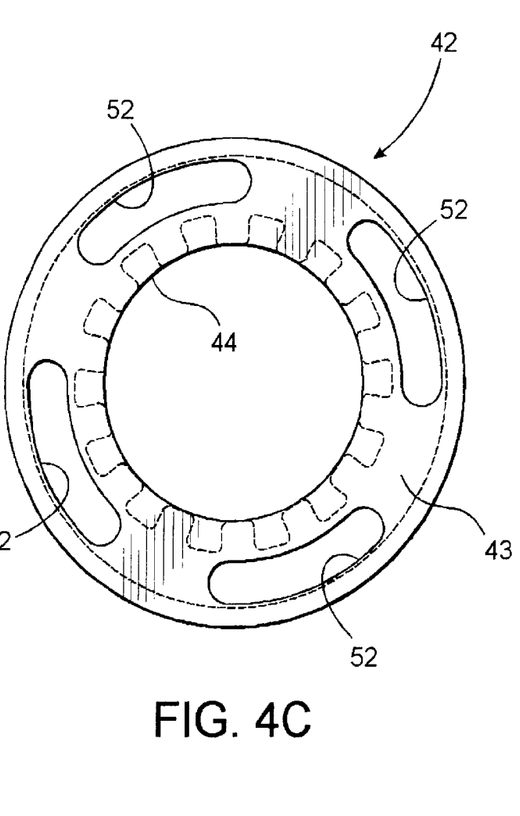
FIG. 4C is a rear view of the embodiment of FIGS. 4A and 4B.
Figure 5A:
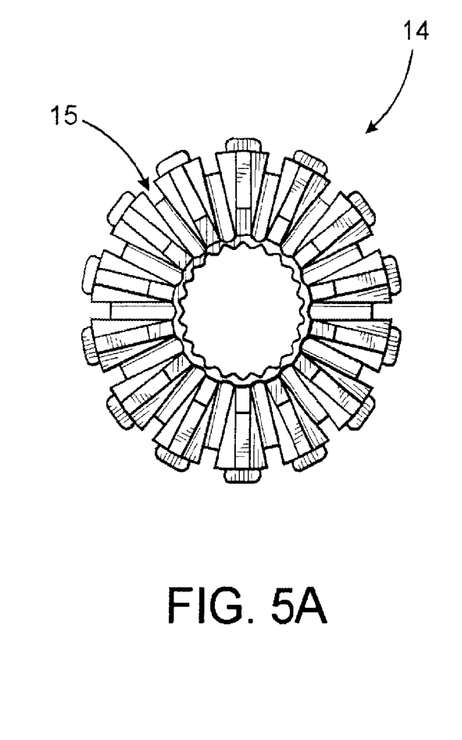
FIG. 5A is a front view of one side gear associated with the locking assembly of the present invention.
Figure 5B:
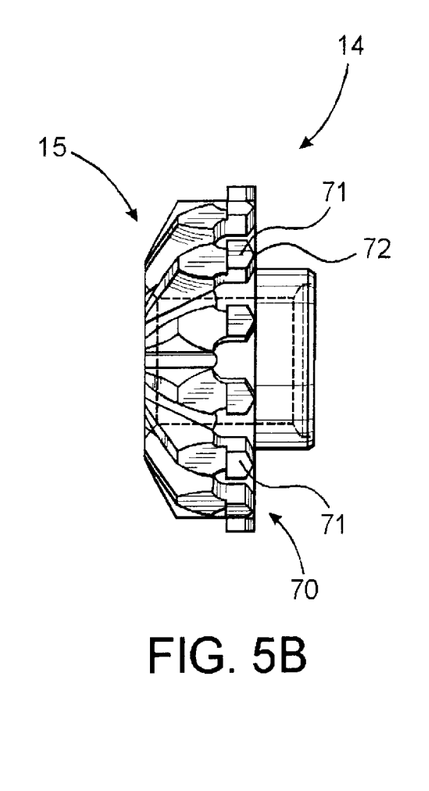
FIG. 5B is a side view of the embodiment of FIG. 5A.
Figure 5C:
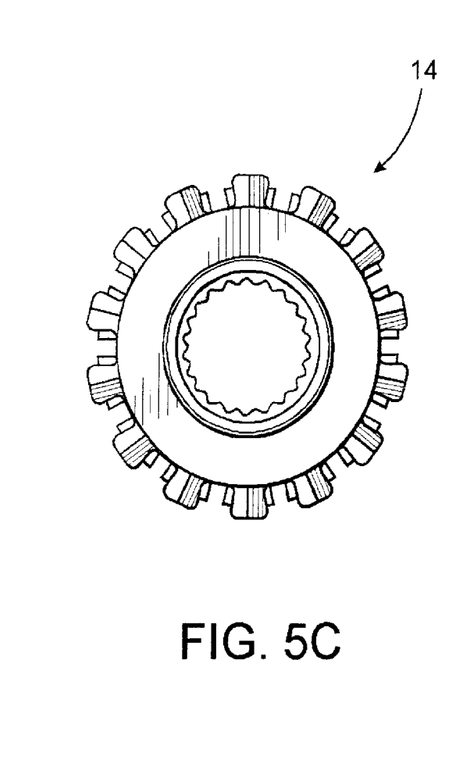
FIG. 5C is a rear view of the embodiment of FIGS. 5A and 5B with a normally operative gear section deleted for purposes of clarity.

Other structural components of the locking assembly 10 of the present invention include a locking member generally indicated as 42 in FIG. 2 and shown in detail in FIGS. 4A, 4B and 4C. The locking member 42 may be more specifically defined by a locking gear plate including a central opening or aperture 44 of sufficient dimension to allow passage therethrough of axle shaft 34 into a splined connection with the one side gear 14, as at 36. In addition, the central opening or aperture 44 is further dimensioned and configured to accommodate the inwardly disposed placement of the hub 46 of the cover member 30, such that an outer hub portion 48 of the one side gear 14 is received therein.

Figure 3:
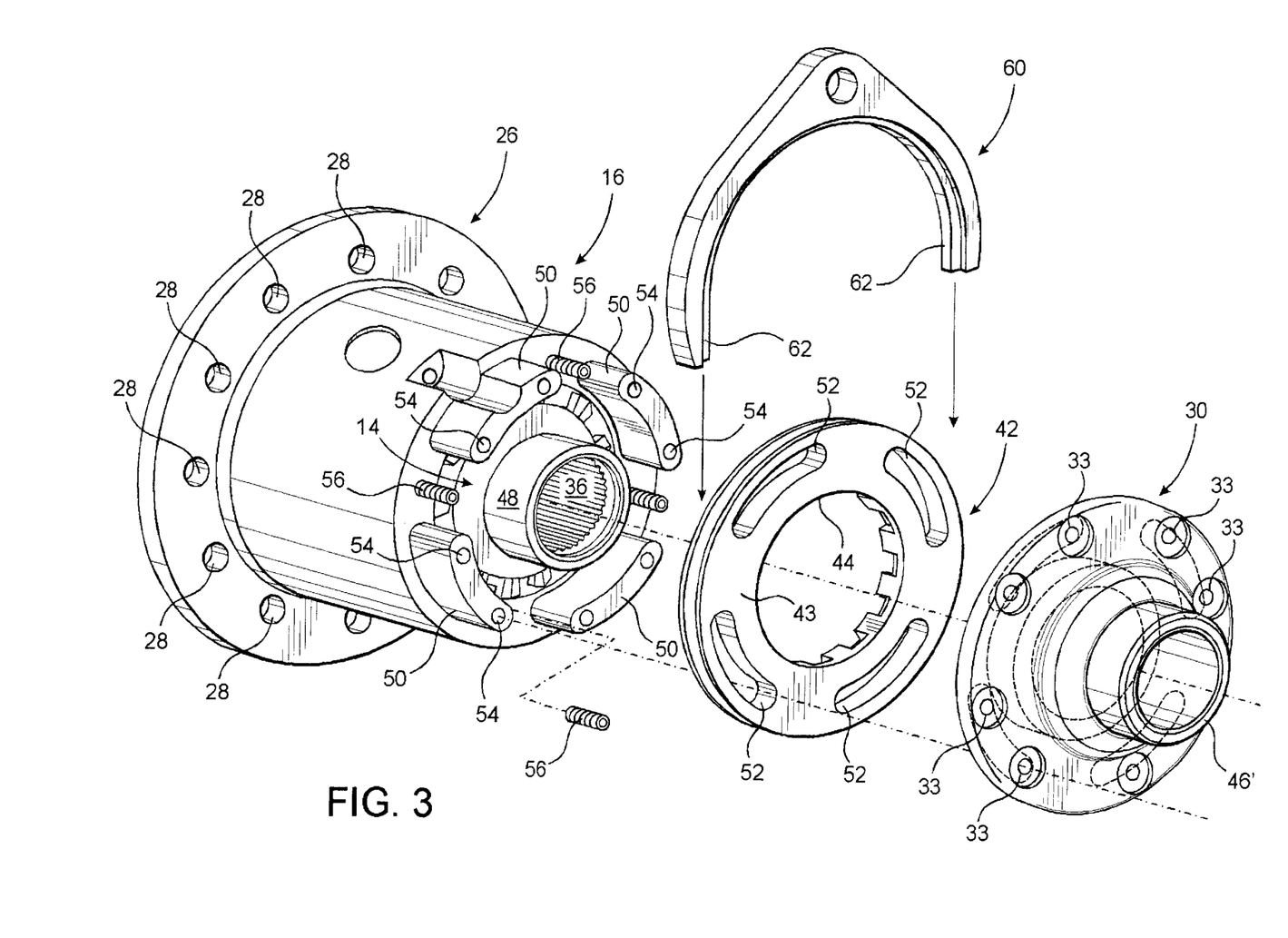
FIG. 3 is an exploded perspective view of the various components of the differential locking assembly of the present invention in partially assembled form.

Another structural feature of the present invention is the inclusion of a mounting assembly which serves to connect and support the locking member 42 to the differential housing 16. The mounting assembly is structured to facilitate rotation of the locking member 42 with the differential housing 16, while at the same time allowing selective positioning or movement of the locking member 42 on and relative to the differential housing 16. Relative movement there between occurs as the locking member 42 is selectively disposed between a locked position and an unlocked position. In one embodiment of the present invention the mounting assembly comprises a plurality of cams 50 integrally or otherwise fixedly formed on the differential housing, 16 as best shown in FIGS. 2 and 3. The cams 50 are disposed in equally spaced apart relation to one another so as to collectively form a substantially annular configuration. Further, each of the cams 50 has a substantially elongated transverse configuration relative to the central axis of rotation of the differential housing 16 and side gears 12 and 14. The cams 50 are preferably four in number and are positioned and configured, as set forth above, in order to best distribute and accommodate the stress and force placed on the differential housing 16 and locking member 42 as the locking assembly is selectively disposed into and out of the locked position. In order to accommodate such selective disposition of the locking member 42, the mounting assembly further comprises a plurality of receiving apertures 52 integrally formed in and correspondingly disposed, dimensioned and configured relative to the array of cams 50. More specifically, each of the receiving apertures 52 are dimensioned to movably receive one of the cams 50 therein, such that the locking member 42 may be axially displaced towards and away from the housing 16 as it is supported on the cams 50.

Selective displacement or positioning of the locking member 42 is accomplished by a positioning assembly including a fork-type shifter generally indicated as 60, to be described in greater detail hereinafter. With further regard to FIG. 3, the cover member 30 is secured in covering or overlying relation to an outer face 43 of the locking member 42 by virtue of a plurality of bolts or like connectors 32 passing through connecting apertures 33 formed in the body of the cover member 30 as shown. In order to further increase the durability and reliable operational characteristics of the locking assembly 10, the connectors 32 pass through the connecting apertures 33 into threaded engagement or like attachment to the cams 50 by open ended slots or channels 54. Accordingly, it should be apparent that the thickness or width of the locking member 42 and accordingly the receiving aperture 52 is less than the outwardly extending protrusion of each of the cams 50. Therefore, the locking member 42 may slide or be otherwise movable on the plurality of cams 50 towards and away from the differential housing 16 through activation of the fork shifter 60, as part of the positioning assembly, to be described in greater detailed hereinafter.

Figures 6A, 6C:
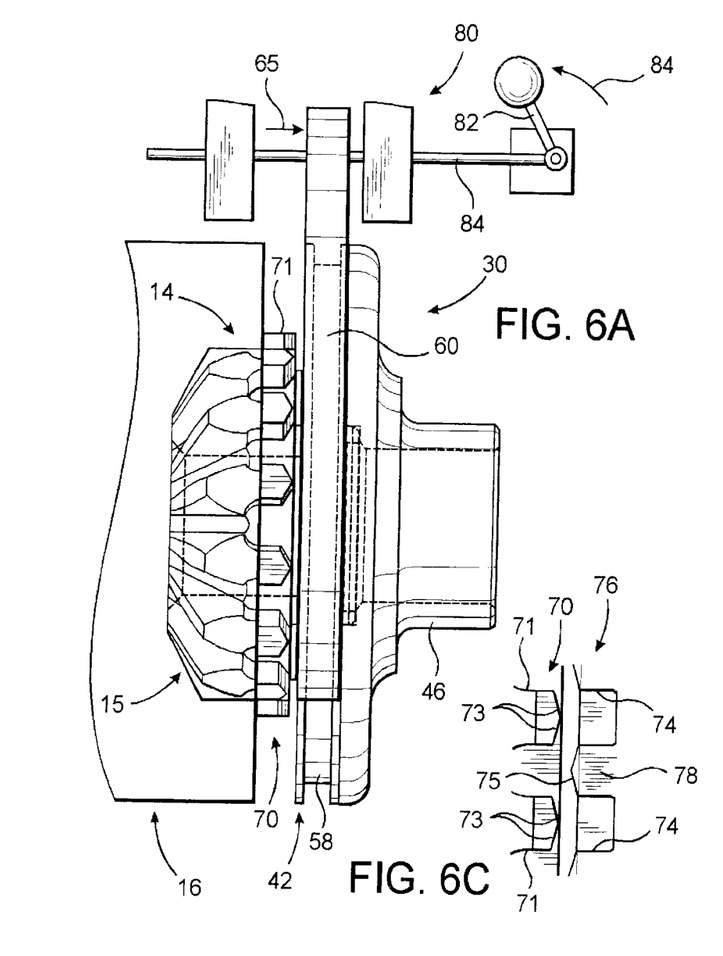
FIG. 6A is a partially schematic side view in cutaway showing features of the locking assembly of the present invention disposed in an unlocked position.
FIG. 6C is a schematic representation in partial cutaway showing the relative positions of a first and second locking gear when the locking assembly of the present is in an unlocked position.
Figures 6B, 6D:
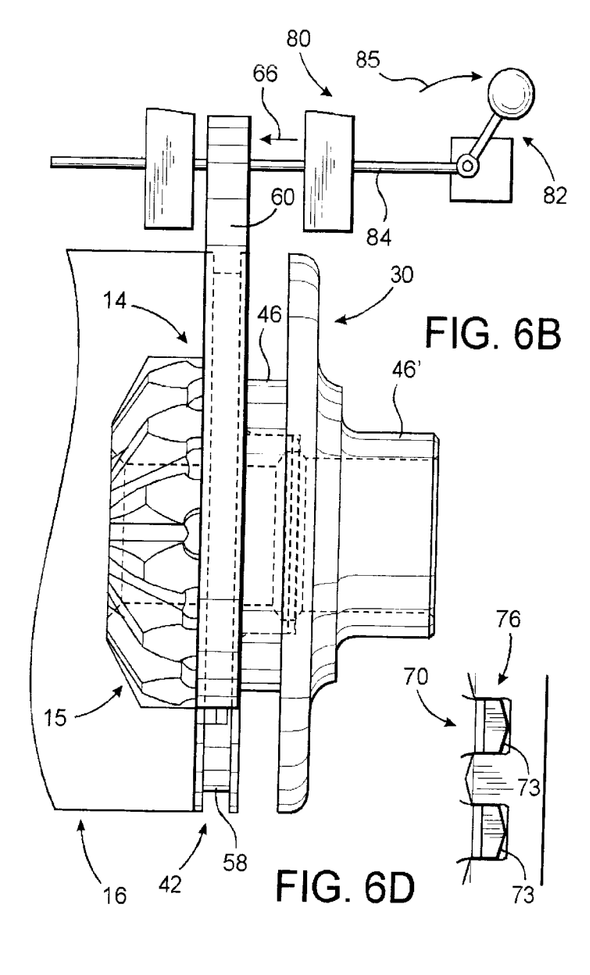
FIG. 6B is a partially schematic side view in cutaway similar to that of FIG. 6A with a locking assembly of the present invention disposed in a locked position.
FIG. 6D is a schematic representation similar to the embodiment of FIG. 6C with the locking assembly of the present invention in a locked position.

Other structural features associated with the mounting and selective movement of the locking member 42 is the provision of a plurality of biasing springs 56 which are interposed between the differential housing 16, as shown in FIG. 3, and an exposed, inner face or surface of the locking member 42. The positioning of the biasing springs 56, in this manner serves to normally exert a biasing force on the locking member 42 which tends to position it in the unlocked position, as will also be described in greater detail. Moving engagement between the fork shifter 60 and the locking member 42 is accomplished through the provision of a continuously configured peripheral groove or channel 58 formed about the outer periphery of the locking member 42. An inner engaging bracket or segment 62 of the fork shifter 60 is disposed and configured to engage the peripheral groove 58. Lateral movement of the fork shifter, in accordance with a directional arrows 65 and 66 of FIG. 6A and 6B, cause selective positioning of the locking member 42 into the unlocked position (FIGS. 6A and 6C) or the locked (FIGS. 6B and 6D).

Yet another structural feature of the present invention is the provision of a locking gear assembly specifically structured to accomplish a secure locking engagement between the locking member 42 and the one side gear 14, to define the aforementioned locked position of the differential locking assembly 10 of the present invention. More specifically, the side gear 14, which also may be referred to as the locking side gear, includes a somewhat conventionally disposed and structured gear set 15 which is intended to rotationally engage the pinion gears 18 and 20, defining the spider gear assembly as set forth above. This interior gear set 15 is equivalent to a correspondingly disposed gear set formed on the other side gear 12 (not shown for purposes of clarity). The first and second side gears 12 and 14 are thereby rotationally interconnected to one another by means of the pinion gears 18 and 20.

However, the locking gear assembly of the present invention includes a first locking gear generally indicated as 70 integrally formed on an outer face or surface 72 of the one locking side gear 14. The plurality of teeth 71 defining the first locking gear 70 are preferably provided in a predetermined number, such as fourteen, which is equal to the number of closed gear pockets 74 formed on and at least partially defining a blind gear assembly 76. The blind gear assembly 76 defines a second locking gear of the aforementioned locking assembly. The term "blind gear assembly", referring to the second locking gear 76 is meant to describe the structural configuration of the closed gear pockets 74 which do not communicate with or protrude through the outer face 43 of the locking member 42. To the contrary the plurality of closed gear pockets 74 are alternately formed adjacent outwardly extending gear teeth 78, and are accessible only from the inner face or surface 45 of the locking gear member 42. The formation of an equal number of fourteen teeth 71 and 78 and an equal number of gear pockets 74 facilitates the movable intermeshing of the side gear 14 and the locking member 42, while maintaining a sufficient strength of the respective components. The respective number of teeth may of course vary and still be within the intended spirit and scope of the present invention. Accordingly, as shown in FIG. 2 the first locking gear 70, integrally formed on the side gear 14, is disposed in somewhat confronting relation to the second locking gear 76, integrally formed on the inner face 45 of the locking member 42. When assembled and in the unlocked position of FIGS. 6A and 6C, the first and second locking gears 70 and 76 are disposed in spaced apart but confronting relation to one another. To the contrary when the first locking gear 70 and the second locking gear 76 are in the locked position of FIGS. 6B and 6D, they are disposed in confronting intermeshing engagement with one another. Locking engagement between the plurality of gear teeth 71 and the closed gear pockets 74 of the first and second locking gears 70 and 76 respectively, are facilitated by applicable dimensioning of the closed gear pockets 74 so as to receive the gear teeth 71 therein. Further, intermeshing engagement is facilitated by forming the outer exposed surfaces 73 and 75 respectively of each of the gear teeth 71 and 78 to include a multi-faceted or multi-sided configuration or other such configuration, such as a curved, beveled or rounded configuration, which will best facilitate sliding, intermeshing engagement with one another.

With primary reference to FIG. 6A through 6D, the differential locking assembly 10 of the present invention incorporates a positioning assembly generally indicated as 80 which includes the fork shifter 60 as described above and which serves to engage the locking member 42 by virtue of the peripheral groove or channel 58 formed therein. Moreover, the positioning assembly 80 includes a manually activated shifter mechanism 82 disposed within the passenger compartment of the motor vehicle. The manual shifter 82 is connected to the fork shifter 60 by any appropriate linkage, but preferably by means of the drive cable 84, as referred to above. Selective movement of the shifter 82 in an appropriate direction as indicated by directional arrows 84 and 85 will respectively serve to position the differential locking assembly 10 of the present invention, into the unlocked position of FIGS. 6A and 6C or the locked position of FIG. 6B and 6D due to the corresponding positioning of the locking member 42 as represented by directional arrow 65 and 66.

Therefore, it should be apparent that the selective positioning of the locking member 42 into the locked position of FIGS. 6B and 6D will serve to lock the one side gear 14 to the locking member 42, and thereby force the one side gear to rotate with the differential housing 16. The differential housing 16 is forced to rotate because of the driving engagement of the ring gear 44 with the drive shaft 38. Therefore, a locked interconnection will occur between both side gears 12 and 14 due to their interconnection with the spider gear assembly, as set forth above. This in turn will force both drive wheels attached to the opposite ends of the axle shafts 32 and 34, to be synchronized and rotate at the same speed. Such synchronized rotation will be established regardless of the resistance on either one or both of the drive wheels, associated with the drive axles 32 and 34, and regardless of either one of the drive wheels are engaging the ground or other surface over which the vehicle is traveling.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A locking assembly for a motor vehicle differential, said locking assembly comprising:
    a) a differential housing rotationally interconnected in driven relation to a drive train of the motor vehicle,
    b) two side gears disposed within said differential housing in rotationally interconnecting relation to one another,
    c) a locking member connected to said differential housing so as to rotate therewith,
    d) a mounting assembly formed at least partially on said housing and said locking member and structured to movably secure said locking member to said differential housing,
    e) said mounting assembly comprising a plurality of cams secured to said differential housing and extending outwardly therefrom in movably supporting engagement with said locking member, and
    f) a positioning assembly disposed to engage said locking member and operative to selectively move said locking member on said housing between a locked position and an unlocked position.

2. A locking assembly as recited in claim 1 further comprising a locking gear assembly selectively disposable between said locked position and said unlocked position, said locking gear assembly comprising a first locking gear formed on said one side gear and a second locking gear formed on said locking member.

3. A locking assembly as recited in claim 2 wherein said first locking gear is integrally formed on an outer surface of said one side gear.

4. A locking assembly as recited in claim 3 wherein said second locking gear is integrally formed on an inner surface of said locking member in confronting relation to said first locking gear.

5. A locking assembly as recited in claim 4 wherein said second locking gear comprises a blind gear assembly including a plurality of alternating gear teeth and closed gear pockets.

6. A locking assembly as recited in claim 5 wherein said first locking gear comprises a predetermined number of gear teeth equal in number to said closed gear pockets of said second locking gear.

7. A locking assembly as recited in claim 6 wherein said predetermined number of gear teeth of both said first and second locking gears equal 14.

8. A locking assembly as recited in claim 1 wherein said cam members are equally spaced from one another and collectively define a substantially annular configuration on said differential housing.

9. A locking assembly as recited in claim 8 wherein each of said cam members comprise a substantially transversely elongated configuration relative to a rotational axis of said differential housing.

10. A locking assembly as recited in claim 9 wherein said locking member comprises a plurality of apertures formed in said locking member, each aperture disposed, dimensioned and configured to receive one of said cam member in sliding engagement therein.

11. A locking assembly as recited in claim 10 further comprising a cover member connected to said plurality of cams in overlying relation to said locking member.

12. A locking assembly as recited in claim 10 wherein said plurality of cams and said plurality of apertures are four in number.

13. A locking assembly as recited in claim 10 wherein said locking member comprises a plurality of apertures formed therein and extending there through, said plurality of apertures being equal in number to said plurality of cams and each of said apertures disposed dimensioned and configured to receive one of said cam member in sliding engagement therein.

14. A locking assembly as recited in claim 13 wherein said plurality of cam members and said plurality of apertures are four in number and are each disposed in a substantially annular configuration respectively on said housing and on said locking member.

15. A locking assembly as recited in claim 13 wherein each of said cams and each of said apertures include a transversely elongated and curvelinear configuration.

16. A locking assembly for a motor vehicle differential, said locking assembly comprising:
    a) a differential housing rotationally interconnected in driven relation to a drive train of the motor vehicle,
    b) two side gears disposed within said differential housing in rotationally interconnected relation to one another,
    c) a locking member connected to said differential housing so as to rotate therewith,
    d) a locking gear assembly comprising a first locking gear and a second locking gear disposed in confronting relation to one another, said first locking gear integrally formed on one of said side gears and said second locking gear integrally formed on said locking member,
    e) a mounting assembly comprising a plurality of cams disposed in spaced apart relation on said differential housing and a plurality of apertures formed in spaced apart relation to one another on said locking member, f) said apertures dimensioned and configured to removably receive said cams therein for movable support of said locking member on said differential housing, g) a positioning assembly disposed to engage said locking member and operative to selectively move said locking member on said differential housing between a locked position and an unlocked position, and h) said locked and said unlocked positions respectively defined by intermeshing engagement and confronting spaced apart relation of said first and second locking gears.

17. A locking assembly as recited in claim 16 wherein said positioning assembly comprises a manual shifter mechanism.

18. A locking assembly as recited in claim 16 wherein each of said cams and each of said apertures comprise a substantially transversely elongated configuration relative to a rotational axis of said differential housing.

19. A locking assembly as recited in claim 16 wherein said first locking gear comprises a plurality of teeth integrally formed on a outer surface of said one side gear and said second locking gear comprises a blind gear assembly including a plurality alternating gear teeth and closed gear pocket, said gear teeth of said first and second locking members being equal in number and said closed gear pockets dimensioned and configured to receive said plurality of gear teeth of said first locking gear therein to define said locked position.

20. A locking assembly as recited in claim 19 wherein said number of gear teeth of both said first locking gear and said second locking gear equal 14.

* * * * *